United States Patent [19]

Adair et al.

[11] Patent Number: 4,801,392

[45] Date of Patent: Jan. 31, 1989

[54] MAGNETIC RECORDING COMPOSITIONS CONTAINING IONIC DYE COMPOUNDS AS INITIATORS

[75] Inventors: Paul C. Adair; Todd M. Hess, both of Dayton, Ohio

[73] Assignee: The Mead Corporation Dayton, Ohio

[21] Appl. No.: 69,354

[22] Filed: Jul. 2, 1987

[51] Int. Cl.$^4$ .......................... C04B 35/26; H01F 1/26
[52] U.S. Cl. .................................. 252/62.54; 428/694; 428/900; 428/913; 427/44; 427/54.1; 427/53.1; 522/25; 522/26; 522/31
[58] Field of Search ...................... 256/62.54; 428/694, 428/900, 913; 427/44, 54.1, 53.1; 522/25, 26, 31

[56] References Cited

U.S. PATENT DOCUMENTS

| | | | |
|---|---|---|---|
| 3,625,744 | 12/1971 | Juna et al. | 427/53.1 |
| 3,627,656 | 12/1971 | Miller et al. | 522/25 |
| 3,708,296 | 1/1973 | Schlesinger | 522/25 |
| 3,721,616 | 3/1973 | Watt | 522/25 |
| 4,175,973 | 11/1979 | Crivello | 522/25 |
| 4,307,182 | 12/1981 | Dalzell et al. | 522/25 |
| 4,394,403 | 7/1983 | Smith | 522/25 |
| 4,555,449 | 11/1985 | Koleske et al. | 252/62.54 |
| 4,560,617 | 12/1985 | Nishimatsu et al. | 252/62.54 |
| 4,596,747 | 6/1986 | Nishimatsu et al. | 427/128 |
| 4,664,964 | 5/1987 | Okita et al. | 428/425.9 |
| 4,694,029 | 9/1987 | Land | 522/25 |
| 4,707,431 | 11/1987 | Umehara | 522/25 |
| 4,707,432 | 11/1987 | Gatechair et al. | 522/25 |

Primary Examiner—William R. Dixon, Jr.
Assistant Examiner—David M. Brunsman

[57] ABSTRACT

The present invention provides magnetic recording compositions containing magnetic particles and a photohardenable composition wherein the photohardenable composition contains a free radical addition polymerizable or crosslinkable compound and an ionic dye-reactive counter ion compound. The ionic dye-reactive counter ion compound is capable of absorbing actinic radiation and producing free radicals within initiate free radical polymerization or crosslinking of the polymerizable or crosslinkable compound. The present invention also provides magnetic recording media incorporating the aforementioned magnetic recording compositions.

11 Claims, No Drawings

MAGNETIC RECORDING COMPOSITIONS CONTAINING IONIC DYE COMPOUNDS AS INITIATORS

BACKGROUND OF THE INVENTION

The present invention relates to novel magnetic recording compositions and to magnetic recording media employing them. More particularly, it relates to magnetic recording compositions containing an ionic dye-reactive counter ion complex as a photoinitiator.

Magnetic recording media exist in the form of magnetic cards and disks, reels, video tapes, and computer tapes. Magnetic tape, for example, is utilized for audio, video, computer, instrumentation, or other recordings. Magnetic tape consists of a magnetic recording composition on a support film. Typically, the magnetic recording composition contains magnetized particles which store information and a resinous binder which provides the cohesive matrix between the magnetic particles and adheres the magnetic particles to the support film.

Solvent-based magnetic recording compositions which are thermally curable are known in the art. For example, U.S. Pat. No. 4,122,234 teaches a composition comprising epoxy resin, polyamine, cellulose acetate butyrate resin, magnetic ion oxide particles, and solvent. The composition is coated onto a substrate and cured at temperatures of about 210° to 240° C. Also, see U.S. Pat. No. 4,609,588.

Solvent-based magnetic recording compositions which are electron beam curable are also known. For example, U.S. Pat. No. 4,607,068 teaches a composition comprising a polyethylenically unsaturated polyurethane oligomer, magnetic pigment, and solvent. The composition is coated onto a substrate and the solvent is allowed to evaporate. The composition is then cured by exposure to election beam radiation. Also, see U.S. Pat. Nos. 4,468,436; 4,496,686; 4,503,198; and 4,634,633.

Solvent-based magnetic recording compositions which are ultraviolet or visible light curable are also known. For example, U.S. Pat. No. 4,585,702 teaches a composition comprising magnetic particles and a lactone-acrylate adduct. The composition can include a photoinitiator such as 2,2-diethoxyacetophenone. The composition is coated onto a substrate and the solvent is allowed to evaporate with or without the use of thermal energy. The composition is then cured by exposure to ultraviolet or visible light. Also, see U.S. Pat. No. 4,555,449.

Solvent-based magnetic recording compositions are disadvantageous because after the composition is applied to a substrate, the solvent has to be allowed to evaporate. Also, the process is expensive because large volumes of solvent must be recovered. Ultraviolet curing of magnetic iron oxide recording compositions is also undesirable because the iron oxide absorbs ultraviolet radiation.

SUMMARY OF THE INVENTION

The present invention provides a visible-light curable magnetic recording composition. The magnetic recording composition comprises magnetic particles and a photohardenable composition wherein the photohardenable composition comprises a free radical addition polymerizable or crosslinkable compound and an ionic dye-reactive counter ion compound. It has been found that ionic dye-reactive counter ion compounds, such as cationic dye-borate anion compounds, are useful photoinitiators of free radical addition reactions. Such compounds consist of a visible light absorber, i.e., the ionic dye, which is ionically bonded to a reactive counter ion. The counter ion is reactive in the sense that upon excitation of the dye, the counter ion donates an election to or accepts an electron from the excited dye. This electron transfer process generates radicals capable of initiating polymerization of a monomer.

The mechanism whereby the compounds absorb energy and generate free radicals is not entirely clear. It is believed that upon exposure to actinic radiation, the dye ion is excited to a singlet state in which it accepts an electron from or donates an electron to the counter ion. For a cationic dye-borate anion compound, this can be illustrated by the following equation:

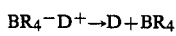

$$BR_4^-D^+ \rightarrow D + BR_4$$

The lifetime of the dye singlet state is extremely short by comparison to the lifetime of the triplet state. The quenching rate constants which have been observed suggest that the ionic compounds experience a very efficient electron transfer via the singlet state. In solution in the polymerizable compound, tight ionic pairing of the counter ion and the dye is believed to provide favorable spacial distribution promoting electron transfer to such an extent that the transfer occurs even though the lifetime of the singlet state is very short. Of course, this does not mean that electron transfer is restricted to the singlet state. Ionic dyes which have significant populations of triplet state may undergo electron transfer through the singlet state, triplet state, or both singlet and triplet states.

Upon transfer of the electron, a radical is formed. Many of the ionic compounds used as initiators in the present invention do not appear to exhibit back electron transfer. It is believed that following electron transfer, the dye and counter ion become disassociated such that back electron transfer does not occur.

The ionic compounds used in the present invention are different than the collision generated species encountered in other photosensitive systems such as collision complexes which yield encounter complexes, exciplexes and/or contact ion pairs. See for example, Kavarnos, George J. and Turro, Nicholas J., 'Photosensitization by Reversible Electron Transfer', *Chem. Rev.* 1986, 401–449.

In accordance with the present invention, the ionic dye and the counter ion are present in the photopolymerizable composition as a stable, non-transient compound, and not as a dissociated ion pair. Formation of the compound is not dependent upon diffusion and collision. As distinguished from photographic materials and compositions containing collision dependent complexes, essentially all of the sensitizing dye present in the photosensitive materials of the present invention prior to exposure is ionically bonded to the counter ion.

The ionic compounds used as initiators in the magnetic recording compositions of the present invention can also be characterized in that they are soluble in nonpolar solvents such as TMPTA and the like. They are soluble in an amount of at least about 0.1%, and perferably, at least about 0.3% by weight. While these amounts are not large, they are substantial considering the normally lower solubility of ionic materials in polar solvents. While the compounds are soluble, the dye and the counter ion do not dissociate in solution. They remain ionically bonded to each other.

In dye-sensitized photopolymerizable compositions, visible light is absorbed by a dye having a comparable absorption band, and the dye is raised to its excited electronic state, the lifetime of which may be $10^{-9}$ to $10^{-3}$ second, depending upon the nature (singlet or triplet) of the excited state. During this time, absorbed energy in the form of an electron must be transferred to or from the dye molecule to produce the free radical. In prior initiator systems, this transfer is diffusion controlled. The excited dye must interact (collide) with another molecule in the composition which quenches the dye and generates a free radical. In the present invention, the transfer is not diffusion (collision) controlled. Electron transfer occurs at greater than diffusion controlled rates. In terms of Stern-Volmer kinetics, this means the quenching constant (Kq) of the excited dye is greater than $10^{10}$, and more particularly, greater than $10^{12}$. At these rates, electron transfer can occur through the singlet state.

Typically, the magnetic particles of the present invention are magnetic iron oxide particles. Magnetic iron oxide absorbs large amounts of ultraviolet radiation. Also, magnetic iron oxide absorbs more blue near the ultraviolet region than green or red. By providing a means for generating free radicals from the excited state of an ionic dye, the present invention provides magnetic recording compositions which are sensitive at longer wavelengths. The magnetic recording compositions are particularly sensitive in the green and red regions of the visible spectrum.

As such, the magnetic recording compositions of the present invention are advantageous over known ultraviolet and visible light curable magnetic recording compositions because as the compositions are particularly sensitive in the green and red regions, magnetic iron oxide particles can be used and they do not absorb the curing radiation. The magnetic recording compositions of the present invention are also advantageous over known solvent-based magnetic recording compositions because the use of solvent is eliminated.

One of the particular advantages of using ionic dye-counter ion compounds as initiators of free radical addition reactions is the ability to select from a wide variety of dyes which absorb at substantially different wavelengths. The absorption characteristics of the compound are principally determined by the dye. Thus, by selecting a dye which absorbs at 480 nm or greater, the sensitivity of the photosensitive material can be extended well into the visible range.

An object of the present invention is to provide magnetic recording compositions and magnetic recording media which are sensitive to visible light, and more particularly to red and/or green light.

A further object of the present invention is to provide magnetic recording compositions which are solvent-free.

Thus, the present invention provides a magnetic coating composition containing magnetic particles and a photohardenable composition wherein the photohardenable composition contains a free radical addition polymerizable or crosslinkable compound and an ionic dye-reactive counter ion compound. The ionic dye-reactive counter ion compound is capable of absorbing actinic radiation and producing free radicals which initiate free radical polymerization or crosslinking of the polymerizable or crosslinkable compound.

In accordance with a more particular embodiment of the present invention, the ionic compound of the magnetic recording compositions is a cationic dye-borate anion compound, and still more particularly, a cyanine dye-borate anion compound or an anionic dye compound such as ionic compounds of xanthene dyes with iodonium or pyryllium ions.

Other objects and advantages of the present invention will become apparent from the following description and appended claims.

DETAILED DESCRIPTION OF THE INVENTION

The magnetic recording compositions of the present invention contain magnetic particles and a photohardenable composition wherein the photohardenable composition contains a free radical addition polymerizable or crosslinkable compound and an ionic dye-reactive counter ion compound.

Cationic dye-borate anion compounds useful in the present invention are known in the art. Their preparation and use in imaging systems is described in U.S. Pat. Nos. 3,567,453; 4,307,182; 4,343,891; 4,447,521; and 4,450,227. The compounds used in the present invention can be represented by the general formula (I):

where $D^+$ is a cationic dye; and $R^1$, $R^2$, $R^3$, and $R^4$ are independently selected from the group consisting of alkyl, aryl, alkaryl, allyl, aralkyl, alkenyl, alkynyl, alicyclic, and saturated or unsaturated heterocyclic groups.

Useful dyes form photoreducible but dark stable complexes with borate anions and can be cationic methine, polymethine, triarylmethane, indoline, thiazine, xanthene, oxazine, and acridine dyes. More specifically, the dyes may be cationic cyanine, carbocyanine, hemicyanine, rhodamine, and azomethine dyes. In addition to being cationic, the dyes should not contain groups which would neutralize or desensitize the complex or render the complex poorly dark stable. Examples of groups which generally should not be present in the dye are acid groups such as free carboxylic or sulphonic acid groups.

Specific examples of useful cationic dyes are Methylene Blue, Safranine O, Malachite Green, cyanine dyes of the general formula (II) and rhodamine dyes of the formula (III):

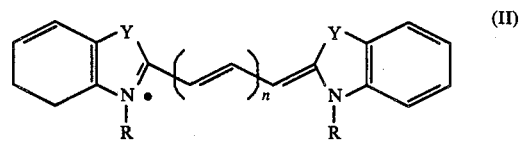

n = 0, 1, 2, 3,
R = alkyl
Y = CH=CH, N—CH$_3$, C(CH$_3$)$_2$, O, S, Se

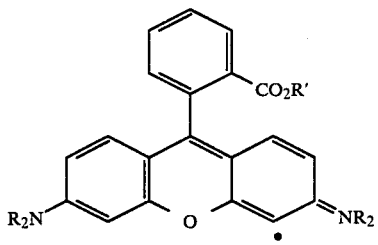

(III)

R', R=alkyl, aryl, and any combination thereof

While they have not been tested, the cationic cyanine dyes disclosed in U.S. Pat. No. 3,495,987 should be useful in the present invention.

The borate anion is designed such that the borate radical generated upon exposure to light and after electron transfer to the dye (Eq. 1) readily dissociates with the formation of a radical as follows:

$$BR_4 \cdot \rightarrow BR_3 + R \cdot \quad \text{(Eq. 2)}$$

For example, particularly preferred anions are triphenylbutylborate and trianisylbutylborate anions because they readily dissociate to triphenylborane or trianisylborane and a butyl radical. On the other hand, tetrabutylborate anion does not work well presumably because the tetrabutylborate radical is not stable and it readily accepts an electron back from the dye in a back electron transfer and does not dissociate efficiently. Likewise, tetraphenylborate anion is very poor because the phenyl radical is not easily formed.

Preferably, at least one but not more than three of $R^1$, $R^2$, $R^3$, and $R^4$ is an alkyl group. Each of $R^1$, $R^2$, $R^3$, and $R^4$ can contain up to 20 carbon atoms, and they typically contain 1 to 7 carbon atoms. More preferably, $R^1$-$R^4$ are a combination of alkyl group(s) and aryl group(s) or aralkyl group(s), and still more preferably, a combination of three aryl groups and one alkyl group.

Representative examples of alkyl groups represented by $R^1$-$R^4$ are methyl, ethyl, propyl, butyl, pentyl, hexyl, octyl, stearyl, etc. The alkyl groups may be substituted, for example, by one or more halogen, cyano, acyloxy, acyl, alkoxy, or hydroxy groups.

Representative examples of aryl groups represented by $R^1$-$R^4$ include phenyl, naphthyl, and substituted aryl groups such as anisyl. Alkaryl groups include methylphenyl, dimethylphenyl, etc. Representative examples of aralkyl groups represented by $R^1$-$R^4$ groups include benzyl. Representative alicyclic groups include cyclobutyl, cyclopentyl, and cyclohexyl groups. Examples of an alkynyl group are propynyl and ethynyl, and examples of alkenyl groups include a vinyl group.

As a general rule, useful ionic dye compounds must be identified empirically; however, potentially useful dye and counter ion combinations can be identified by reference to the Weller equation (Rehm, D. and Weller, A., *Isr. J Chem.* (1970), 8, 259–271), which can be simplified as follows.

$$\Delta G = E_{ox} - E_{red} - E_{h\nu} \quad \text{(Eq. 3)}$$

where $\Delta G$ is the change in the Gibbs free energy, $E_{ox}$ is the oxidation potential of the borate anion $BR_4^-$, $E_{red}$ is the reduction potential of the cationic dye, and $E_{h\nu}$ is the energy of light used to excite the dye. Useful compounds will have a negative free energy change. Similarly, the difference between the reduction potential of the dye and the oxidation potential of the borate must be negative for the compounds to be dark stable, i.e., $E_{ox} - E_{red} > 0$.

As indicated, Eq. 2 is a simplification and it does not absolutely predict whether a compound will be useful in the present invention or not. There are a number of other factors which will influence this determination. One such factor is the effect of the monomer on the compound. Another factor is the radial distance between the ions. It is also known that if the Weller equation produces too negative a value, deviations from the equation are possible. Furthermore, the Weller equation only predicts electron transfer, it does not predict whether a particular compound is an efficient initiator of polymerization. The equation is a useful first approximation.

Specific examples of cationic dye-borate anion compounds useful in the present invention are shown in the following table with their λ max.

TABLE

| Compound No. | Structure | λmax (TMPTA) |
|---|---|---|
| 1. | <br>Ph₃B⊖n-C₄H₉ | 552 nm |
| 2. | <br>Ph₃B⊖n-C₄H₉ | 568 nm |

TABLE-continued
3. 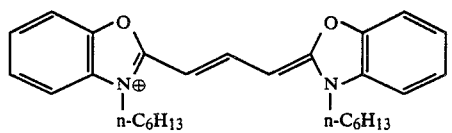 492 nm
4. 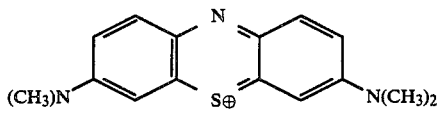 658 nm
5. 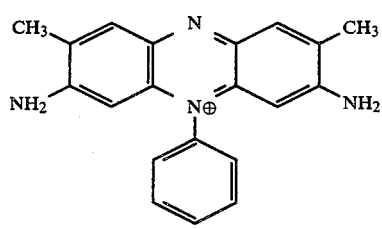 528 nm
6. 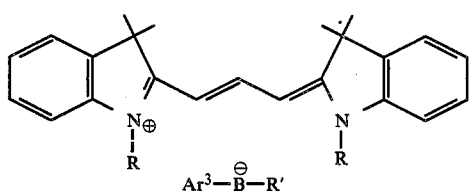 550 nm
| No. | R' | R | Ar |
|---|---|---|---|
| 6A | methyl | n-butyl | phenyl |
| 6B | methyl | n-hexyl | phenyl |
| 6C | n-butyl | n-butyl | phenyl |
| 6D | n-butyl | n-hexyl | phenyl |
| 6E | n-heptyl | n-butyl | phenyl |
| 6F | n-heptyl | n-hexyl | phenyl |
| 6G | ethyl | n-butyl | phenyl |
7. 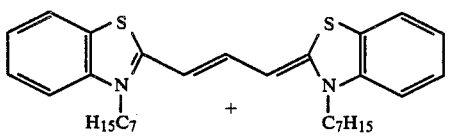 570 nm System
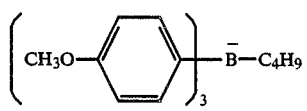
8. 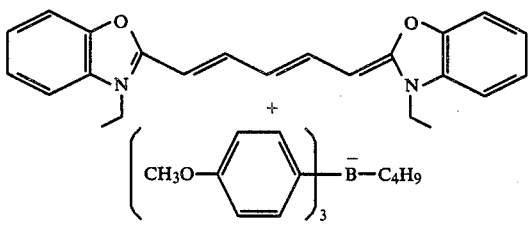 590 nm System
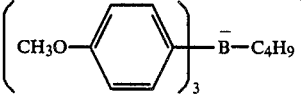

TABLE-continued 9.    640 nm

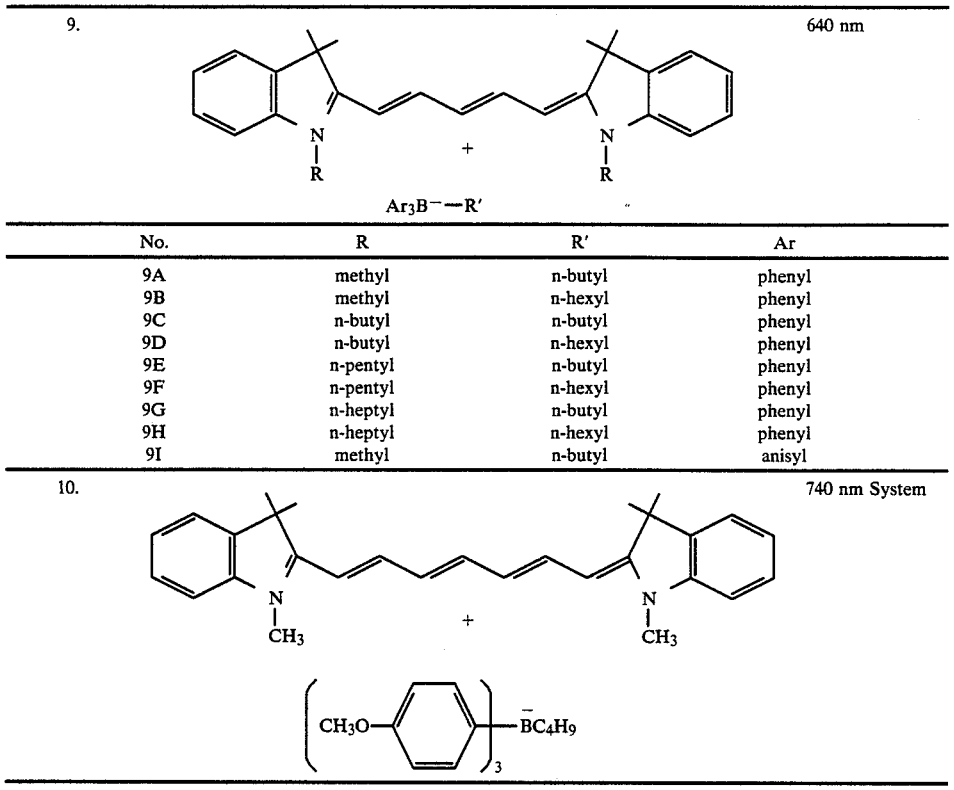

| No. | R | R' | Ar |
|-----|---|----|----|
| 9A | methyl | n-butyl | phenyl |
| 9B | methyl | n-hexyl | phenyl |
| 9C | n-butyl | n-butyl | phenyl |
| 9D | n-butyl | n-hexyl | phenyl |
| 9E | n-pentyl | n-butyl | phenyl |
| 9F | n-pentyl | n-hexyl | phenyl |
| 9G | n-heptyl | n-butyl | phenyl |
| 9H | n-heptyl | n-hexyl | phenyl |
| 9I | methyl | n-butyl | anisyl |

10.   740 nm System

The cationic dye-borate anion compounds can be prepared by reacting a borate salt with a dye in a counterion exchange in a known manner. See Hishiki, Y., Repts. Sci. Research Inst. (1953), 29, pp. 72–79. Useful borate salts are sodium salts such as sodium tetraphenylborate, sodium triphenylbutylborate, sodium trianisylbutylborate and ammonium salts such as tetraethylammonium tetraphenylborate.

Anionic dye compounds are also useful in the present invention. Anionic dye-iodonium ion compounds of the formula (IV):

$$[R^5—I^{61}—R^6]_n D^{-n} \quad (IV)$$

where $D^-$ is an anionic dye and $R^5$ and $R^6$ are independently selected from the group consisting of aromatic nucleii such as phenyl or naphthyl and n is 1 or 2; and anionic dye-pyryllium compounds of the formula (V):

(V)

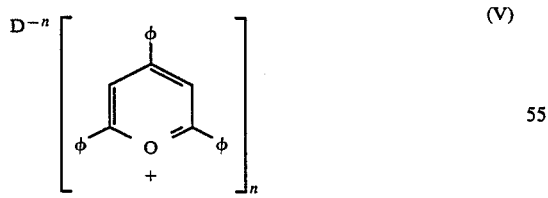

where $D^-$ and n are as defined above are typical examples of anionic dye complexes.

Representative examples of anionic dyes include xanthene and oxonol dyes. For example, Rose Bengal, eosin, erythiosin, and fluorescein dyes are useful. In addition to iodonium and pyryllium ions, other compounds of anionic dyes and sulfonium and phosphonium cations are potentially useful.

As in the case of the cationic dye compounds, useful dye-cation combinations can be identified through the Weller equation as having a negative free energy.

Selected examples of anionic dye compounds are shown in Table 2 (λ max. ca. 570 nm in TMPTA). In Table 2, the symbol φ is used for a phenyl group and the structure

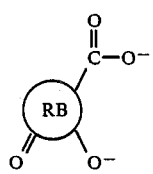

is used for

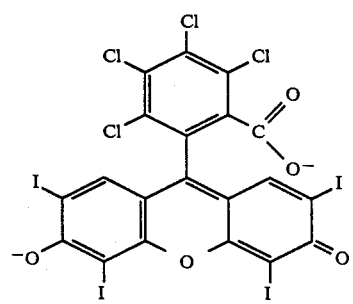

TABLE 2

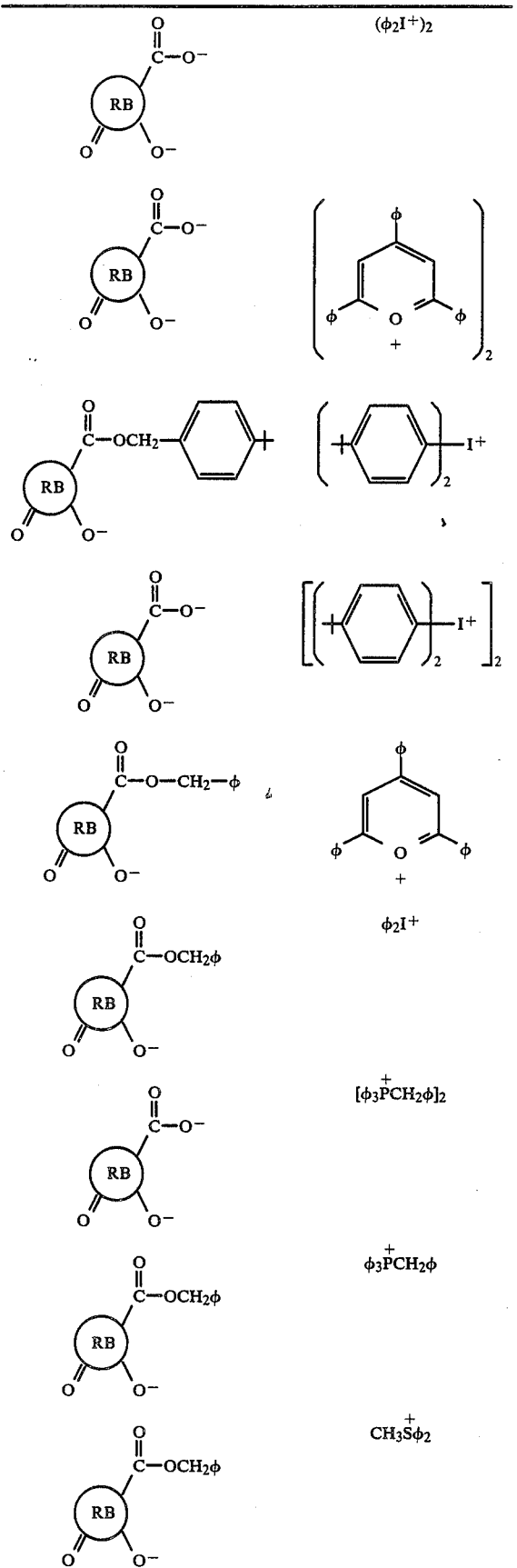
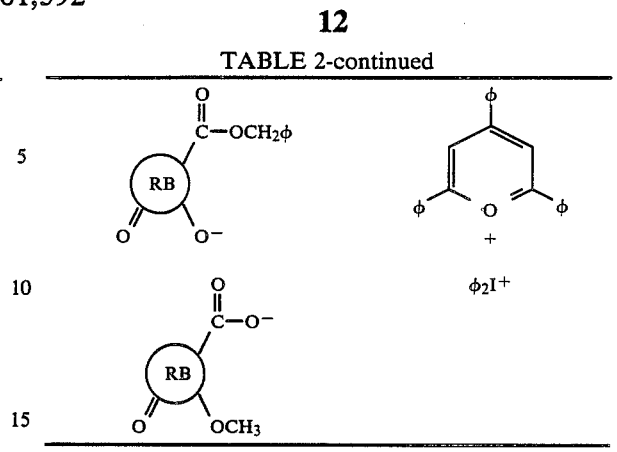

The most typical example of a free radical addition polymerizable or crosslinkable compound useful in the present invention is an ethylenically unsaturated compound, and more specifically, a polyethylenically unsaturated compound. These compounds include both monomers having one or more ethylenically unsaturated groups, such as vinyl or allyl groups, and polymers having terminal or pendant ethylenic unsaturation. Such compounds are well known in the art and include acrylic and methacrylic esters of polyhydric alcohols such as trimethylolpropane, pentaerythritol, and the like; and acrylate or methacrylate terminated epoxy resins, acrylate or methacrylate terminated polyesters, etc. Representative examples include ethylene glycol diacrylate, ethylene glycol dimethacrylate, trimethylolpropane triacrylate (TMPTA), pentaerythritol tetraacrylate, pentaerythritol tetramethacrylate, dipentaerythritol hydroxypentacrylate (DPHPA), hexanediol-1,6-dimethacrylate, and diethyleneglycol dimethacrylate.

The ionic dye compound is usually used in an amount up to about 1% by weight based on the weight of the photopolymerizable or crosslinkable species in the photohardenable composition. More typically, the compound is used in an amount of about 0.2% to 0.5% by weight.

While the compound can be used alone as the initiator, curing speeds tend to be quite low and oxygen inhibition is observed. It has been found that it is preferable to use the compound in combination with an autoxidizer. An autoxidizer is a compound which is capable of consuming oxygen in a free radical chain process. Alternatively, the composition can be cured in an oxygen free environment.

Examples of useful autoxidizers are N,N-dialkylanilines. Examples of preferred N,N-dialkylanilines are dialkylanilines substituted in one or more of the ortho-, meta-, or para- position by the following groups: methyl, ethyl, isopropyl, t-butyl, 3,4-tetramethylene, phenyl, trifluoromethyl, acetyl, ethoxycarbonyl, carboxy, carboxylate, trimethylsilylmethyl, trimethylsilyl, triethylsilyl, trimethylgermanyl, triethylgermanyl, trimethylstannyl, triethylstannyl, n-butoxy, n-pentyloxy, phenoxy, hydroxy, acetyl-oxy, methylthio, ethylthio, isopropylthio, thio-(mercapto-), acetylthio, fluoro, chloro, bromo, and iodo.

Representative examples of N,N-dialkylanilines useful in the present invention are 4-cyano-N,N-dimethylaniline; 4-acetyl-N,N-dimethylaniline; 4-bromo-N,N-dimethylaniline; ethyl 4-(N,N-dimethylamino)benzoate; 3-chloro-N,N-dimethylaniline; 4-chloro-N,N-dimethylaniline; 3-ethoxy-N,N-dimethylaniline; 4- fluoro-N,N-dimethylaniline; 4-methyl-N,N-dimethylaniline; 4-ethoxy-N,N-dimethylaniline; N,N-dimethylthioanicidine; 4-amino- N,N-dimethylaniline; 3-hydroxy-N,N-dimethylaniline; N,N,N',N'-tetramethyl-1,4dianiline; 4-acetamido-N,N-dimethylaniline, etc.

Preferred N,N-dialkylanilines are substituted with an alkyl group in the ortho-position and include 2,6-diisopropyl-N,N-dimethylaniline; 2,6-diethyl-N,N-dimethylaniline; N,N,2,4,6-pentamethylaniline (PMA); and p-t-butyl-N,N-dimethylaniline.

The autoxidizers are preferably used in the present invention in concentrations of about 4–5% by weight.

Synthesis Examples 1 and 2 respectively illustrate the preparation of borates and dye-borate compounds.

SYNTHESIS EXAMPLE 1

Dissolve triphenylborane in 150 ml dry benzene (1M) under nitrogen atmosphere. Place flask in a cool water bath, and while stirring, add n-BuLi, (1.1 eg.) via syringe. A white precipitate soon formed after addition was started. Stirring is continued about 45–60 min. Dilute with 100 ml hexane and filter, washing with hexane. This resultant Li salt is slightly air unstable. Dissolve the white powder in about 200 ml distilled water and, with vigorous stirring, add aqueous solution of tetramethyl ammonium chloride. (1.2 eg. of theoretical in 200 ml). A thick white precipitate forms. Stir this aqueous mixture about 30 min. at room temperature, then filter. Wash collected white solid with distilled water.

As an alternative synthesis, to a 1.0M solution of 2.0 equivalents of 1-butene in dry, oxygen-free dichloromethane, under inert atmosphere, was added slowly dropwise with stirring, 1.0 equivalents of a 1.0M solution of dibromethane-methylsulfide complex in dichloromethane. The reaction mixture was stirred at reflux for 36 hours and the dichloromethane and excess 1-butene were removed by simple distillation. Vacuum distillation of the residue afforded 0.95 equivalents of a colorless mobile oil (Bp 66–7 0.35 mm Hg, "BNMR;bs (4.83PPM)). Under inert atmosphere, this oil was dissolved in dry, oxygen-free tetrahydrofuran to give a 1.0M solution and 3.0 equivalents of a 2.0M solution of phenylmagnesium chloride in tetrahydrofuran were added dropwise with stirring. After stirring 16 hours, the resultant solution was added slowly with vigorous stirring to 2 equivalents of tetramethylammonium chloride, as a 0.2M solution, in water. The resulting white flocculate solid was filtered and dried to afford a near quantitative amount of the desired product (Mp 250°–2° C., "BNMR;bs (-3.70PPM)).

SYNTHESIS EXAMPLE 2

Sonicate a suspension of a borate salt (1 g/10 ml) in MeOH, to make a very fine suspension. Protect flask from light by wrapping with aluminum foil and then add 1 equivalent of dye. Stir this solution with low heat on a hot plate for about 30 min. Let cool to room temperature and then dilute with 5–10 volumes of ice water. Filter the resultant solid and wash with water until washings are colorlsss. Suction filter to dryness. Completely dry initiator compound by low heat (about 50° C.) in a vacuum drying oven. Initiator is usually formed quantitatively. Analysis by H-NMR indicates 1:1 compound formation typically greater than 90%.

In addition to the photohardenable composition, the magnetic recording composition also contains magnetic particles. Examples of useful magnetic particles are acicular or granular gamma —$Fe_2O_3$; $Fe_3O_4$; Co-doped gamma —$Fe_2O_3$; Co-doped gamma —$Fe_2O_3$—$Fe_3O_4$ solid solution; Co-base-compound-absorbed gamma —$Fe_2O_3$; a Co-base-compound-absorbed $Fe_3O_4$; and acicular $CrO_2$. The term "Co-base-compound" as used herein means cobalt oxide, cobalt hydroxide, cobalt ferrite, cobalt ion-absorbates and the like. The magnetic particles may also be a ferromagnetic metal element or alloy such as Co, Fe-Co, Fe-Co-Ni or the like. Preferably, the magnetic particle is $Fe_2O_3$.

In addition to the aforementioned photohardenable composition and magnetic particles, the magnetic recording composition may also contain additives such as dispersants, lubricants, abrasives, atistatic agents, or anti-corrosive agents.

As the aforementioned dispersants (pigment wetting agents), fatty acids with 12 to 18 carbon atoms ($R_7COOH$, wherein $R_7$ represents alkyl or alkenyl groups having 11 to 17 carbon atoms) such as caprylic acid, capric acid, lauric acid, myristic acid, palmitinic acid, stearic acid oleic acid, elaidic acid, linolic acid or stearolic acid; metal soaps consisting of alkali metal salts (such as Li, Na or K salts) or alkali earth metal salts (such as Mg, Ca or Ba salts) of the aforementioned fatty acids; fluorine compounds of the esters of the aforementioned fatty acids, amides of the aforementioned fatty acids; poly-alkylenoxide alkyl-phosphoric esters; or tri-alkyl-poly-olefin oxy-quaternary ammonium salt, where alkyl has 1 to 5 carbon atoms, and olefin such as ethylene or propylene may be used. Higher alcohols with more than 12 carbon atoms and sulfuric acid esters may also be employed. These dispersants may be used in an amount of 0.5 to 20 parts by weight to 100 parts by weight of the photohardenable composition. A particularly useful dispersant is lecithin.

As the aforementioned lubricants, a silicon oil such as dialkylpolysiloxane (with 1 to 5 carbon atoms in the alkyl part), dialcoxypolysiloxane (with 1 to 4 carbon atoms in the alcoxy component), monoalkyl-monoalcoxypolysiloxane (with 1 to 5 carbon atoms in the alkyl part and 1 to 4 carbon atoms in the alcoxy part), phenylpolysiloxane or fluoroalkylpolysiloxane (with 1 to 5 carbon atoms in the alkyl part); fine powders of electrically conductive material such as graphite; fine powders of inorganic materials such as molybdenum disulfide wolfram disulfide; fine powders of plastic materials such as polyethylene, polypropylene, polyethylenevinyl chloride copolymer or polytetrafluoroethylene; alpha-olefin polymers; unsaturated aliphatic hydrocarbons that are liquid at ambient temperature (compounds having an alpha-olefin double bond attached to the terminal carbon, with about 20 carbon atoms); fatty acid esters formed by a monobasic fatty acid with 12 to 20 carbons and a monohydric alcohol with 3 to 12 carbons); and fluorocarbons may be employed. These lubricants may be used in an amount of 0.2 to 20 parts by weight to 100 parts by weight of the photohardenable composition.

As the aforementioned abrasives, those commonly used materials such as molten alumina, silicon carbide, chromium oxide ($Cr_2O_3$), corrundum, artificial corrundum, diamond, artificial diamond, garnet or emery (consisting essentially of corrundum and magnetite) may be employed. Preferably, these abrasives should have Mohs hardness higher than 5 and an average particle size in the range of 0.05 to 5 microns and especially in the range of 0.1 to 2 microns. These abrasives may be used in an amount of 0.5 to 20 parts by weight to 100 parts by weight of the photohardenable composition.

As the aforementioned antistatic agents, fine powders of electrically conductive materials, such as carbon black or carbon black graft polymer; natural surfactants such as saponin; nonionic surfactants derived from alkylene oxides, glycerin or glycidols; higher alkylamines; quaternary ammonium salts; heterocyclic compounds such as pyridine; cationic surfactants such as phosphonium; anionic surfactants containing carboxylic acid residues, sulfonic acid residues, phosphoric acid residues or acidic groups such as sulfuric acid ester or phosphoric acid ester residues; or amphoteric surfactants such as amino acids, aminosulfonic acids or sulfuric acid or phosphoric acid esters of amino alcohols may be employed. The aforementioned fine powders of the electrically conductive materials and surfactants may be used in amounts of 0.2 to 20 parts by weight and 0.1 to 10 parts by weight to 100 parts by weight of the photohardenable composition, respectively. These surfactants may be used either singly or as a mixture, as desired. While these surfactants are used as antistatic agents, they may also be used for other purposes, as for example for improving dispersion or magnetic properties or lubricity or as coating assistive agents.

As the aforementioned anti-corrosive agents, phosphoric acid, sulfamide, guanidine, pyridine, amine, urea, zinc chromate, calcium chromate, or strontium chromate can be used. The anti-corrosive effects can be improved especially when vaporizable anti-corrosive agents (organic or inorganic acid salts of amines, amides or imides) such as dicyclohexylamine nitrate, cyclohexylamine chromate, diisopropylamine nitrite, diethanolamine phosphate, cyclohexylammonium carbonate, hexamethylenediamine carbonate, propylenediamine stearate, guanidine carbonate, triethanolaminenitrite, or morpholine stearate are employed. These anti-corrosive agents can be used in an amount of 0.1 to 20 parts by weight to 100 parts by weight of the ferromagnetic fine powders.

The photohardenable composition, magnetic particles, and other additives are mixed in a conventional manner and coated onto a substrate. Conventional coating techniques such as air doctor, blade, air knife, squeeze immerse, reverse roll, transfer roll, gravure, kiss, cast, spray, spin, and bar can be used.

Substrates commonly used in magnetic recording media are useful in the present invention. Useful examples of substrates are polyesters such as polyethylene terephthalate or polyethylene 2,6-naphthalate; polyolefins such as polyethylene or polypropylene; cellulose derivatives such as cellulose triacetate, cellulose diacetate, cellulose acetate butylate, or cellulose acetate propionate; vinyl resin such as polyvinyl chloride or polyvinylidene chloride; plastics such as polycarbonate, polyimide, polyamide, or polyarylether; non-magnetic metals such as aluminum, copper, tin, zinc or non-magnetic alloys containing these metals; ceramics such as glass, porcelain, or china; paper; or alpha-polyolefins with 2 to 10 carbon atoms such as polyethylene, polypropylene, or ethylene-butene copolymers. It is well known that pretreatment of the film may be beneficial to promote wetting and adhesion. Preferred substrates are polyethylene terephthalate and polyethylene 2,6-naphthalate. Typically, the coating thickness ranges from about 1.3 to 15 microns.

After coating the magnetic recording layer onto the substrate, the magnetic particles are oriented using a conventional magnetic field orientation technique. The magnetic field for the orientation of the magnetic particles can be about 500 to 2,000 oersted using either a DC or an AC magnetic field. The direction of orientation of the magnetic particles is determined depending upon the end-use purpose of the magnetic recording medium to be produced. Typically, in audio tapes, small-sized video tapes, and memory tapes, the orientation direction is parallel to the longitudinal direction of the tape while in video tapes for broadcasting, the orientation direction is inclined at an angle of about 30° to 90° with respect to the longitudinal direction of the tape.

On the side opposite to the magnetic recording layer, the substrate may be back-coated in order to prevent generation of static charges, print through, and wow-flutter, and to improve upon the mechanical strength of the magnetic recording layer.

The surface smoothening process for the magnetic recording layer is conducted using a calendering process comprising passing the magnetic recording medium between a specular roll and another specular roll, or between a specular roll and an elastic roll. A suitable specular roll is a metal roll while a suitable elastic roll is a cotton roll or a synthetic resin, e.g., nylon or polyurethane, roll. Suitable conditions for the calendering process are a roll pressure of about 25 to 100 kg/cm$^2$ (linear pressure of about 80 to 320 kg/cm), and a temperature of about 10° to 150° C.

The magnetic recording layer is cured upon exposure to red or green light. Any source of red or green light can be used for curing the magnetic recording layer. Exposure times are from about 1 second to 10 minutes depending upon the amounts of photohardenable composition used, the light source used, the distance between the light source and the magnetic recording composition, and the thickness of the magnetic recording composition.

The magnetic recording media of the present invention can be in the form of magnetic cards and disks, reels, video tapes, and computer tapes. The magnetic recording media are particularly useful as audio or video magnetic tapes. Information is recorded on or erased from the magnetic recording media by using conventional techniques.

The present invention is more fully illustrated by the following non-limiting Examples.

EXAMPLE

Two solutions were made. Solution A contained 1.0 g of isopropylthioxanthone (Quanticure ITX, Ward-Blenkinsop) in 50 g of trimethylolpropanetriacrylate (TMPTA, Sartomer). ITX is a very effective UV initiator (wavelength max=390 nm). Solution B contained 0.1 g of a red-sensitive initiator; 1,1-di-n-pentyl-3,3,3,3-tetramethylindodicarbocyanine triphenyl-n-butylborate, in 50 g of TMPTA. Under dark conditions, 25 g of gamma-iron oxide (Pferrox 2228 HC, Pfizer, Inc.) was added to both Solution A and B while stirring with an overhead mixer. Upon attainment of a uniform consistency, 0.5 g of 2,6-diisopropyl-N,N-dimethylaniline was added to each and mixing continued for another five minutes. The resultant highly viscous mixtures were coated on 3 mil Mylar with a 0.5 mil (12.7 microns)-gap coating blade.

Both samples A and B were placed in a glass-covered frame and were flushed with argon. The samples were then exposed for 1.5 minutes with two F15T8.CW fluorescent tubes at a distance of 20 cm. Upon sample recovery, the sample from solution A was tacky at the surface and liquid below the surface. Sample B was fully cured.

Having described the invention in detail and by reference to preferred embodiments thereof, it will be apparent that modifications and variations are possible without departing from the scope of the invention defined in the appended claims.

What is claimed is:

1. A magnetic recording composition comprising magnetic particles and a photohardenable composition, said photohardenable composition comprising a free radical addition polymerizable or crosslinkable compound and an ionic dye-reactive counter ion compound, said ionic dye-reactive counter ion compound being a stable non-transient compound capable of absorbing actinic radiation and producing free radicals which initiate free radical polymerization or crosslinking of said polymerizable or crosslinkable compound.

2. The magnetic recording composition of claim 1 wherein said magnetic particles are magnetic iron oxide.

3. The magnetic recording composition of claim 2 wherein said magnetic particles comprise $Fe_2O_3$.

4. The magnetic recording composition of claim 3 wherein said ionic dye-reactive counter ion compound is soluble in said free radical addition polymerizable or crosslinked compound.

5. The magnetic recording composition of claim 3 wherein said ionic dye-reactive counter ion compound is characterized in that following exposure of said compound to light, said dye is excited to a singlet state which is quenched by said counter ion.

6. The magnetic recording composition of claim 5 wherein following exposure of said ionic dye-reactive counter ion compound to light, an electron is transferred from said dye to said counter ion or from counter ion to said dye and the rate of said electron transfer is greater than a diffusion controlled rate.

7. The magnetic recording composition of claim 3 wherein said ionic dye-reactive counter ion compound is an anionic dye compound.

8. The magnetic recording composition of claim 7 wherein said anionic dye is selected from the group consisting of xanthene and oxonol dyes.

9. The magnetic recording composition of claim 3 wherein said polymerizable or crosslinkable compound is an ethylenically unsaturated compound.

10. The magnetic recording composition of claim 7 said ionic dye-reactive counter ion compound is an anionic dye-iodonium ion complex or an anionic dye-pyryllium ion complex.

11. The magnetic recording composition of claim 10 wherein said dye is a xanthene dye.

* * * * *